United States Patent [19]

Nienhuis et al.

[11] Patent Number: 4,605,988

[45] Date of Patent: Aug. 12, 1986

[54] ANTI-STATIC GROUNDING ARRANGEMENT FOR WORK ENVIRONMENT SYSTEM

[75] Inventors: James H. Nienhuis, Wyoming; Charles P. Schreiner, Saugatuck, both of Mich.

[73] Assignee: Herman Miller, Inc., Zeeland, Mich.

[21] Appl. No.: 469,902

[22] Filed: Feb. 25, 1983

[51] Int. Cl.[4] .......................... H02B 1/06; H05F 3/02

[52] U.S. Cl. .......................................... 361/429; 174/6; 174/51; 206/334; 211/26; 211/126; 280/47.19; 280/47.35; 361/212

[58] Field of Search ............... 361/212, 214, 215, 216, 361/331, 332, 429, 220; 206/328–334; 174/6, 51; 312/17.2, 223; 211/26, 126; 191/11; 280/47.19, 47.35; 211/88; 220/18

[56] References Cited

U.S. PATENT DOCUMENTS

| | | | |
|---|---|---|---|
| 1,545,672 | 6/1925 | McArthur | 361/215 |
| 2,526,908 | 10/1950 | Selhost | 174/6 |
| 2,533,403 | 12/1950 | Schultz | 174/6 |
| 2,623,089 | 12/1952 | Greene et al. | 174/6 |
| 2,753,491 | 7/1956 | Legge | 361/219 |
| 2,858,482 | 10/1958 | Nutter | 361/216 |
| 3,594,490 | 7/1971 | Mitchell et al. | 174/25 R |
| 3,698,565 | 10/1972 | Weber | 211/126 |
| 3,734,526 | 5/1973 | Propst et al. | 211/126 |
| 3,917,978 | 11/1975 | Menzet et al. | 361/220 |
| 4,028,590 | 6/1977 | Bishop | 361/220 |
| 4,160,503 | 6/1979 | Ohlbach | 361/212 |
| 4,211,324 | 7/1980 | Ohlbach | 206/328 |
| 4,260,849 | 4/1981 | Kirby | 361/331 |
| 4,404,615 | 9/1983 | Dep | 361/212 |
| 4,421,233 | 12/1983 | Burnett | 206/334 |
| 4,439,809 | 3/1984 | Weight et al. | 361/220 |
| 4,457,436 | 7/1984 | Kelley | 211/88 |

FOREIGN PATENT DOCUMENTS

| | | | |
|---|---|---|---|
| 0719558 | 10/1965 | Canada | 211/126 |
| 0349186 | 5/1931 | United Kingdom | 211/126 |

OTHER PUBLICATIONS

Robert Mishur, Velostat, "Stamp Out Static", 7/23/79, pp. 1–6.

*Primary Examiner*—A. D. Pellinen
*Assistant Examiner*—Gregory D. Thompson
*Attorney, Agent, or Firm*—Varnum, Riddering, Schmidt & Howlett

[57] ABSTRACT

An anti-static grounding arrangement is adapted for use in a work environment system having work stations (100) with work surfaces (182) and conductive storage containers (132, 160) capable of housing electronic components or similar items which are sensitive to electrostatic charge accumulations. Hanger rails (120) and dispensing rails (162) for suspending the containers (132, 160) from work station panels (102, 104) include metallic grounding plates (124, 168) which contact the conductive container (132, 160) surfaces. The grounding plates (124, 168) are conductively connected to ground wires (138, 148, 178) which provide a low impedance path from the grounding strips (124, 168) to an earth ground. The grounding arrangement also includes metallic plates (232, 252) for use with transport carts (220, 240) which transport certain of the containers (132) between work stations (100).

9 Claims, 13 Drawing Figures

ANTI-STATIC GROUNDING ARRANGEMENT FOR WORK ENVIRONMENT SYSTEM

DESCRIPTION

1. Technical Field

The invention relates to work environment systems and, more particularly, relates to anti-static grounding arrangements in work environment systems for preventing build-up of electrostatic charge on storage components of work stations and component transport carts.

2. Background Art

In offices, factories and other commercial and industrial environments, it is important to avoid build-up of electrostatic charges on environmental surfaces. That is, it is advantageous to provide a path of discharge from those surfaces on which electrostatic charge tends to accumulate.

To provide a discharge path from a single stationary surface is not difficult. However, in a modern work environment system having work stations with functional components (work surfaces, storage containers, etc.) which can be selectively located and moved with respect to each other and with respect to supporting frames, electrostatic charges tend to more readily accumulate. That is, electrostatic accumulation tends to occur when surfaces are nonintegral and during movement of surfaces relative to each other.

Furthermore, when work environment systems include components movable relative to supporting frames, it is difficult to achieve a discharge path to a common ground which interconnects all component and frame surfaces. If low impedance interconnections are not achieved, whereby the surfaces tend to be at equipotential levels, electrostatic charge accumulation will occur regardless of the grounding configuration.

In addition, the modern functional work environment system will often include not only means for storing various items at work stations, but also means for transporting the items between work stations and to various other locations as required. For example, large numbers of various items can be stored in work system environments having containers located on stationary support frames. The containers themselves can often be removed from the support frames and transported by means such as carts to other locations as required. However, movement of the containers, with requisite handling by personnel, readily causes electrostatic charge build-up. In addition, in various commerical and industrial environments, storage apparatus is often located near sources of electromagnetic radiation, such as power lines, industrial machinery or computers. Each of these sources increases the tendency for electrostatic charge build-up on storage components. The charge build-up can occur not only between the support frames and storage containers, but also relative to earth potentials at differing locations.

Historically, prevention of build-up of electrostatic charges on surfaces normally contacted by persons, or on the persons themselves due to frictional contact with other surfaces, was to avoid disagreeable, though usually harmless, shocks when contact was made and discharge occurred. Recently, however, the problem of electrostatic charge build-up has become of primary importance with the advent of electronic devices which operate with extremely low power signals. With such devices, such as high density digital computer circuit packs, noise created by discharge of high accumulation electrostatic charges can permanently damage the circuit packs and other electronic devices during storage and transport.

Because of the highly sensitive nature of electronic components, harmful electrostatic potentials can develop merely due to spurious electromagnetic spacial radiation. Furthermore, harmful levels of electrostatic charge can accumulate on surfaces which are not particularly susceptible to charge build-up, if extremely low impedance discharge paths within the work environment systems are not integral with or otherwise connected to such surfaces and provide a means to ground or otherwise discharge the spurious electrostatic charge. For example, storage containers for electronic components must not exhibit any electrical isolation from their support frames, although the containers are movable relative to the frames.

Finally, in modern work environment systems, it is necessary that grounding arrangements do not contain any bulky circuits or other parts which could hinder users of the systems. Furthermore, in modern office work environment systems, it is also necessary that grounding arrangements be asthetically pleasing and conform to the general design and structure of the work stations.

To achieve some level of electrostatic charge protection in work environments such as product assembly and storage locations, it is known to construct containers for holding static sensitive devices from anti-static materials. These materials typically have a resistivity in the intermediate range of $10^{10}$–$10^{14}$ ohms per square unit. One such type of material is commercially known as Pink Poly and storage containers constructed of Pink Poly are commercially available from the Henry Mann Company. Other commercially available containers are constructed of materials having higher conductivity, such as high-density carbon embedded materials. However, when such containers are moved from location to location, and when multiple containers are not directly connected to a common ground, they can lend to accumulate electrostatic charge.

Furthermore, though containers may be constructed of intermediate or high conductivity materials, the support frame surfaces on which they are mounted can tend to electrically isolate the containers from an earth ground. Alternatively, if the support frames are constructed of, for example, carbon steel or like conductive materials, and left unpainted to provide low impedance discharge paths to ground, they will rapidly corrode.

Another procedure for obtaining a low impedance discharge path through component supports is to utilize a conductive paint. However, to obtain a highly conductive paint, it is necessary to "dope" a resin base such as phenol formaldehyde with highly conductive materials such as carbon granules. This process and the requisite bases necessary to utilize a doping procedure are relatively expensive, especially if it is necessary to cover large surface areas. In addition, the paint conductivity is often not sufficient to provide a suitable low impedance grounding path from nonintegrally connected components.

Another known method of reducing electrostatic charge accumulation is to provide users of the work environment system with conductive clothing and conductive articles (such as wrist straps, heel grounders, etc.) which ground the users to work station components (containers, work surfaces, etc.) at which they are working. In addition, such anti-static articles can include conductive floor mats and similar items. However, such clothing and articles tend to be cumbersome for users, do not provide for grounding of containers during transport and do not provide for common ground interconnections between different components or between components and supporting frames.

Other procedures have been utilized to reduce electrostatic charge accumulation in environments substantially different from commercial and industrial work systems.

For example, to achieve conductivity and low impedance discharge paths on computer frame surfaces, electroplating processes have often been used. Cadmium plating can provide a low resistance and somewhat corrosion-proof metallic coating to prevent build-up of electrostatic charge. However, any type of electroplating process is typically expensive. Furthermore, to ensure an even coating of plating materials, special bath tanks or other bath receptacles are often necessary to ensure an even disposition of the coatings over the surfaces. Such electroplating and bath tank processes are neither cost effective nor particularly suitable to the various structures utilized in work environment system configurations.

Other means for achieving low impedance discharge paths on computer frame materials include the use of a conductive paint. For example, in the Mitchell et al U.S. Pat. No. 3,594,490, issued July 20, 1971, an electronic grounding system is disclosed for reducing noise from electrostatic discharges between computer main frame apparatus and operating personnel having access to main frame doors. The metallic portions of the main frame are coated with a conductive paint. In addition, metallic rectangles are attached to the computer main frame on the painted surfaces so as to make contact with finger stock material mounted to the doors. Various means are described for attaching the rectangles to the main frame, including rivets, conductive adhesives and adhesive/epoxy combinations. The utilization of the metallic rectangles effectuates a parallel configuration of the painted surfaces, thereby reducing the overall impedance of the grounding path between the doors and the metallic portion of the main frame.

Other types of grounding arrangements are also directed to environments substantially different from commercial and industrial work systems. For example, the Nutter U.S. Pat. No. 2,858,482, issued Oct. 28, 1958, describes a static electricity grounding device directed to the problem of electrostatic charge build-up in automobiles and, specifically, to the problem of build-up of electrostatic potentials between a person and automobile seat covers due to frictional contact. As another example, the Legge U.S. Pat. No. 2,753,491, issued July 3, 1956, discloses a grounding device for objects such as operating tables in hospital environments. The Legge device includes a hook for connecting the grounding arrangement to the operating table, a tensioning member to provide adjustable device length and a weighted ground member with a rotatable metallic ball to insure continuous contact with the floor.

DISCLOSURE OF THE INVENTION

In accordance with the invention, a work environment system includes a grounding arrangement having conductive interface means between system components to ensure adequate grounding and prevent electrostatic charge accumulation. The work environment system includes support frames having relatively non-conductive surfaces which define work stations and storage areas. Containers having conductive properties and work surfaces are mounted to the support frames and the conductive interface means are mounted intermediate the containers and frames. Interface grounding means connect the conductive interface means to an earth ground to provide a low impedance discharge path from the containers, work surfaces and frames.

The work environment system also includes transport carts having frames to mount the containers. The conductive interface means are positioned on at least one of the cart frames at a point of contact between the frame and the container mounted on the frame.

In one embodiment of the invention, the conductive means includes metallic grounding plates mounted to the support frames. The interface grounding means is interconnected to each of the grounding plates associated with one of the work stations. In addition, the interface grounding means includes ground clamping means connected to the conductive interface means and support frames associated with one of the work stations to interconnect the support frames, containers and work surfaces to a common earth ground.

The ground clamping means includes impinging means to pierce painted surfaces of the support frames so as to provide a low impedance discharge path between the support frames and the common earth ground. The interface grounding means can also include wire means interconnecting the metallic grounding plates, the ground clamping means and the earth ground.

The conductive interface means also includes metallic grounding plates conductively connected to the transport carts, so that each of the conductive containers is adapted to contact at least one of the grounding plates when it is suspended from the transport cart. The conductive interface means also includes a conductive laminate mounted to the work surfaces, and the interface grounding means provides electrical contact between the conductive laminate and the earth ground.

In accordance with further specific embodiments of the invention, the interface grounding means includes at least one conductive caster mounted to each of the transport carts. In addition, the conductive containers can be constructed of plastic materials having conductive carbon materials embedded therein.

BRIEF DESCRIPTION OF DRAWINGS

A preferred embodiment of the invention will now be described with respect to the drawings, in which.

Figure 11:
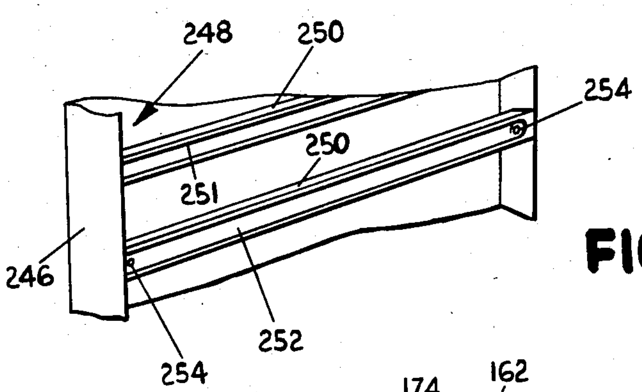
Figure 12:
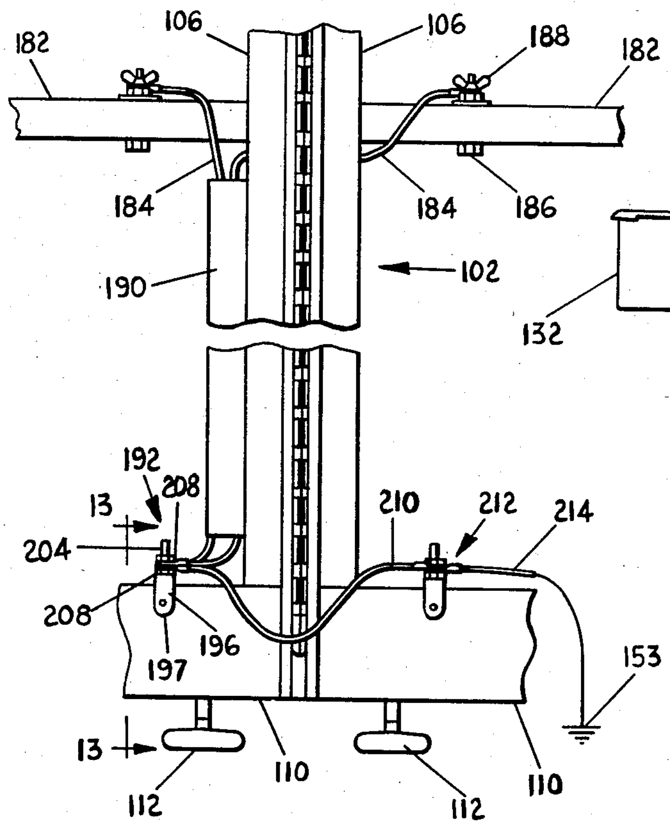
Figure 10:
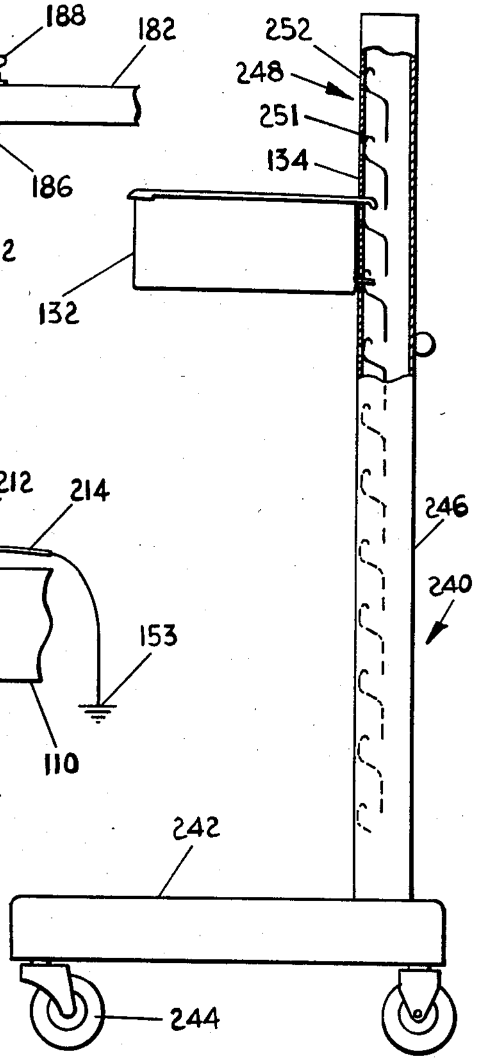
Figure 13:
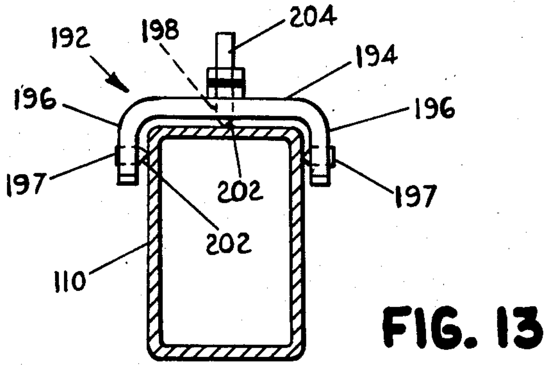

IFIG. 10 is a side view of an additional transport cart having a grounding arrangement in accordance with the invention;

FIG. 11 is a partial view of the transport cart depicted in FIG. 10 showing the connection of a conductive plate in accordance with the invention;

FIG. 12 is a partial view of a ground clamp arrangement for use in a grounding arrangement in accordance with the invention; and FIG. 13 is a partial view of the panel attachment used with the ground clamp arrangement depicted in FIG. 12.

BEST MODE FOR CARRYING OUT THE INVENTION

Figure 1:
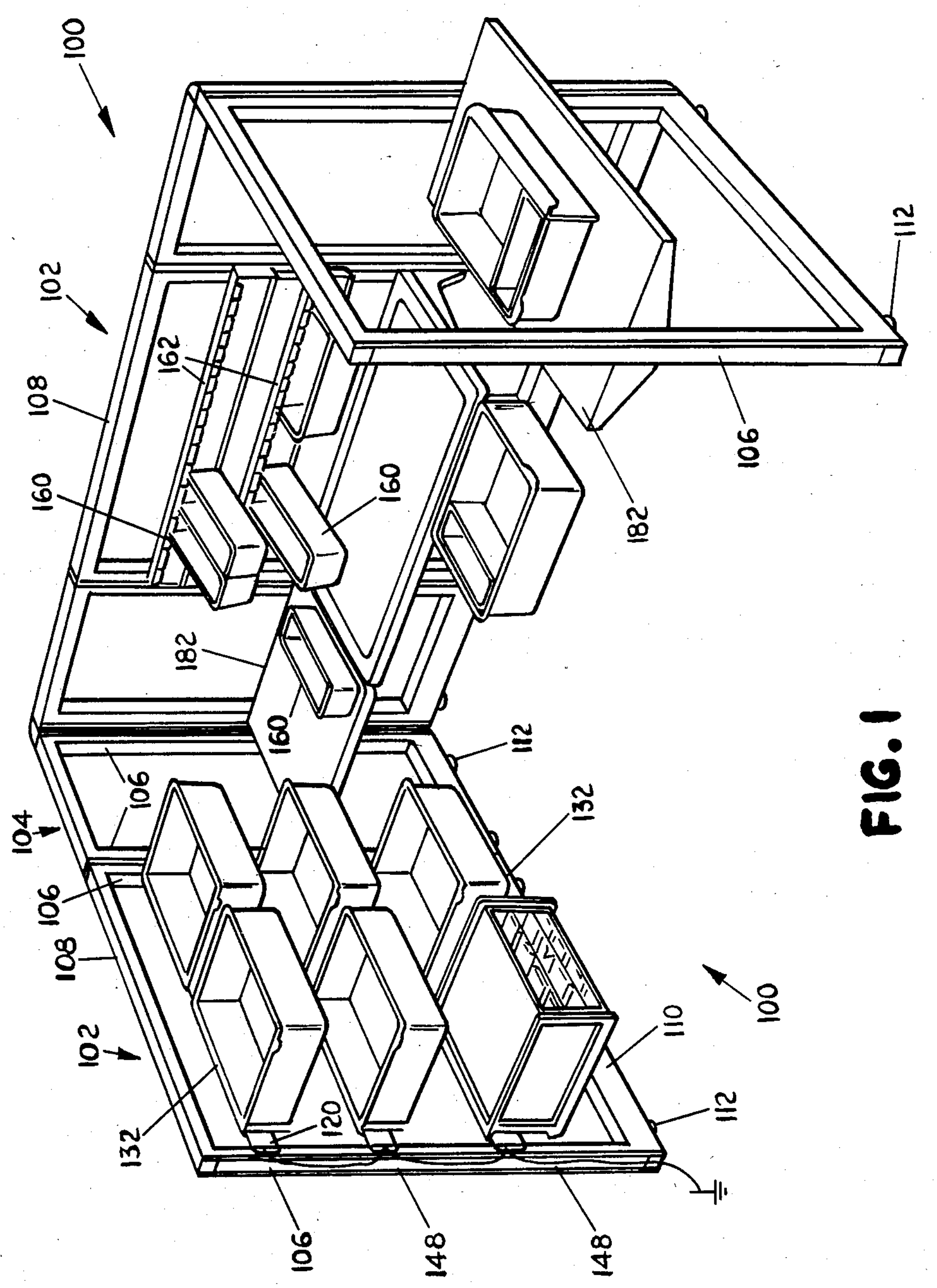
FIG. 1 is a perspective view of one work station of a work environment system having a grounding arrangement in accordance with the invention.

The principles of the invention are disclosed, by way of example, in a work station 100 of a work environment system as depicted in FIG. 1. It should be emphasized that the work environment system can comprise numerous stations similar to work station 100. A typical work station 100 as shown in FIG. 1 can include frames comprising a series of variously sized panel members such as wide panel members 102 and narrow panel members 104. The panels 102 and 104 are of a rectangular frame configuration and each includes a pair of vertical side members 106, an upper horizontally disposed top member 108 and a lower horizontally disposed bottom member 110. Each of the panel members 102 and 104 can be secured to adjacent panel members by suitable and well-known connecting means (not shown). The lower members 110 of the panels 102 and 104 can be positioned immediately above ground level by means such as ground supports 112 partially depicted in FIG. 1.

Advantageously, the anti-static grounding arrangement subsequently described herein in accordance with the invention does not depend on either the ground supports 112 or structual connecting means between the panels 102 and 104 being of low impedance or high conductivity to achieve a suitable discharge path between the elements of work station 100 and an earth ground. In addition, the panel members 102 and 104 can be painted to avoid corrosion and need not be constructed of highly conductive materials. For example, the panel members 102 and 104 can be constructed of normal grade steel.

The work station 100 includes various types of storage components and work surfaces to achieve a functionally efficient work station which can be structually positioned in accordance with user requirements. The functional purposes of work station 100 can vary widely. For example, work station 100 may be adapted for assembly of specific products ("work") from numerous component parts stored at the work station. This concept of work station product assembly is somewhat in contrast to the typical assembly line method of product assembly, but has been found to work well in certain environments and with particular types of products. In addition to work station 100, the work environment system can also include means for transporting work between work stations (as described subsequently herein), storage areas, shipping areas and similar types of functional locations.

Figure 2:
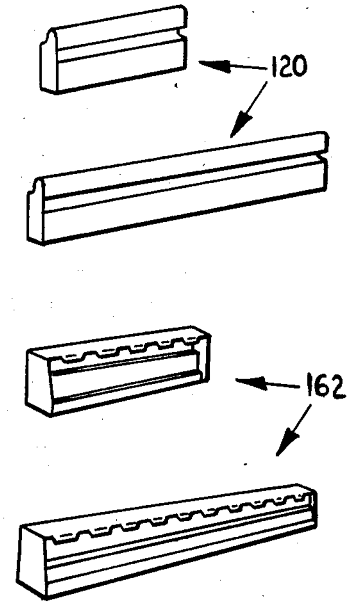
FIG. 2 is a perspective view of variously sized hanger rails which can be utilized at the work station depicted in FIG. 1.
Figure 4:
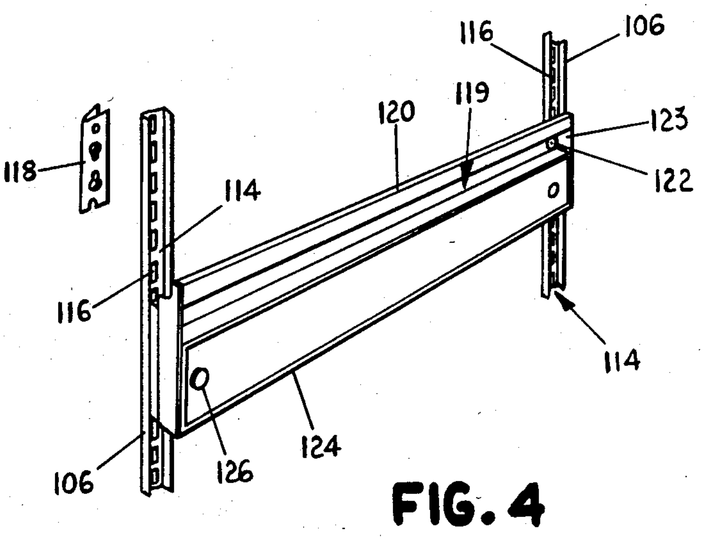
FIG. 4 is a perspective view of a hanger rail showing the means for attaching the rail to a work station support frame.

For purposes of obtaining storage space whereby the storage medium itself can be transported to another location, hanger rails 120 of various widths as depicted in FIG. 2 (to correspond to the widths of panels 102 and 104) can be secured to the panels 102 and 104. To secure the hanger rails 120 to the panels 102 and 104, and as depicted in FIG. 4, each of the side members 106 of the panels 102 and 104 can include a channel 114 having vertically disposed slots 116 spaced apart along the channel 114. Hanger clips 118 having teeth (not shown) or other means to engage the slots 116 can be positioned at a desired height on the side members 106 relative to ground level.

The hanger rail 120 is secured to the hanger clips 118 by means of threaded screws 122 or other suitable connecting means through holes 123 in recessed portion 119 of rail 120 and through clips 118. Preferably, the screws 122 can also threadably engage holes in the side members 106 so that tightening of screws 122 will rigidly secure the hanger rail 120 to clips 118 and will additionally secure both the rail 120 and clips 118 to the side member 106.

Figure 3:
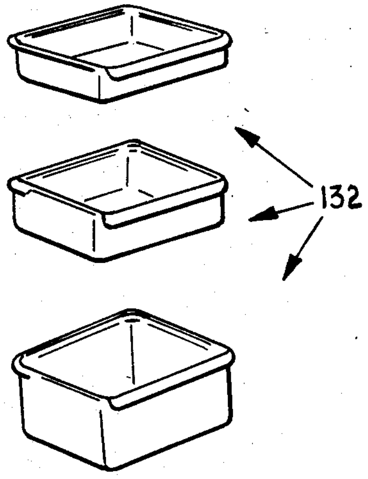
FIG. 3 is a perspective view of variously sized totes which can be removably attached to the hanger rails depicted in FIG. 2.

The hanger rails 120 are utilized to removably suspend storage containers referred to herein as "totes" 132 (such as those depicted in FIG. 3 with an optional cover 133) which can be utilized for storage of electrically sensitive items such as electronic computer components in a manner so that the components can be moved from work station to work station or to other locations by merely moving the entire tote 132. To facilitate ease of movement, the totes 132 can be constructed of lightweight materials, such as plastics. To provide a grounding arrangement in accordance with the invention, the totes 132 should also have an intermediate or high conductivity. For example, the totes 132 can be manufactured with an "anti-static" grade of plastic materials, typically having a resistivity in the range of $10^{10}$–$10^{14}$ ohms per square unit. For purposes of description and for purposes of defining the invention in claims appended hereto, the term "conductive" as used with reference to the totes 132 and other work components described herein shall mean both antistatic grade construction and construction of higher conductivity (i.e. resistivity less than the range of $10^{10}$–$10^{14}$ ohms per square unit).

Though the conductivity of the totes 132 assists in avoiding substantial accumulation of electrostatic charge, some charge may still accumulate and must be discharged, especially when the totes 132 are moved from one work station to another location. Without the grounding arrangement described herein, and with the support panels 102 and 104 constructed of metallic materials but painted to avoid corrosion, discharge of electrostatic charge on the totes 132 may be prevented and damage to the electrically sensitive stored components can occur. Alternatively, if metallic surfaces of the panel members 102 and 104 which contact (directly or indirectly) the totes 132 remain unpainted, corrosion can readily occur. Furthermore, even with the panels remaining unpainted or being electroplated, the conductivity of a discharge path through the structural configuration of the panels 102 and 104 may be insufficient to discharge the electrostatic charge accumulation on the totes 132 to a level harmless to the stored components.

Figure 5:
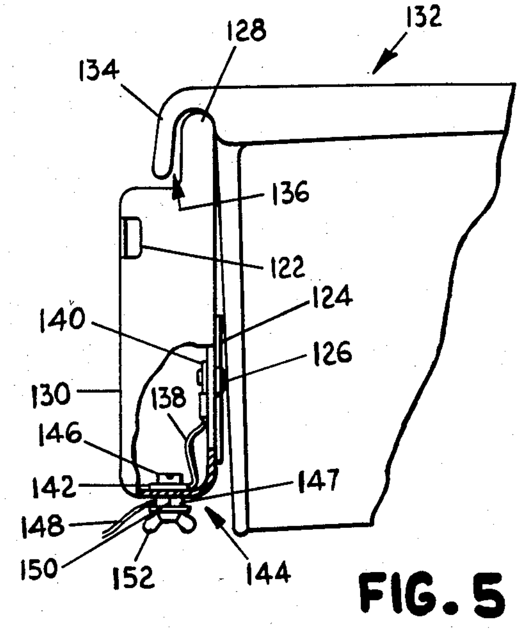
FIG. 5 is a side view of a tote and hanger rail depicting the interconnections thereof and the grounding arrangement in accordance with the invention.

To overcome the afore-described problems, the hanger rails 120 each include a highly conductive metallic grounding plate 124 constructed of stainless steel or other conductive and corrosion resistant material. As described herein, the plates 124 provide a conductive interface between the rails 120 and container totes 132. The plate 124 is rigidly secured in a horizontal manner across the front portion of hanger rail 120 by an adhesive on the back surface of the strip 124. Copper rivets 126 as shown in FIGS. 4 and 5 extend through the plates 124 and the hanger rails 120. The rail 120 also includes a vertical finger section 128 extending along the length of rail 120 and which protrudes upwardly from a main body 130 of rail 120. As depicted in FIG. 5, each tote 132 includes a lip 134 which forms an elongated channel 136 corresponding in size and configuration to the finger section 128. The lip 134 fits over the finger section 128 to removably suspend the tote 132 from the hanger rail 120.

With the tote 132 suspended from hanger rail 120 as described above, the outer surface of the rear portion of tote 132 contacts the plate 124 along the length thereof and between rivets 126 as depicted in FIG. 5. By providing a large cross-sectional contact area between the plate 124 and tote 132, a low impedance discharge path is provided from the tote 132. Furthermore, the metallic plates 124 provide a conductive interface between the totes 132 and the panel members 102 and 104.

Again referring to FIG. 5, each of a pair of short ground wires 138 are permanently attached to one end of a corresponding one of the rivets 126 by any suitable connecting means such as a conductive ring connector 140 permanently mounted to the rear portion of rivet 126. (FIG. 5 depicts only one of the rivets 126 and ground wires 138). The other end of each of the ground wires 138 terminates at a second ring connector 142. The ring connector 142 is secured to the upper portion of a lower surface 144 of rail 120 by connecting means such as machine screw 146 and nut 147. The machine screw 146 extends through a bore in the lower surface 144 and a long ground wire 148 having a connector ring 150 is secured to the lower portion of plate 144 by means of a machine screw 146 and a wing nut 152 or similar means.

The long ground wire 148 can be directly attached to any suitable electrical earth ground. Preferably, the ground wires 148 can be connected to a common earth ground, so as to avoid the possibility of electrical potentials developing between separately ground locations. For example, ground wires 148 from various hanger rails 120 can be "chained" together as generally depicted in FIG. 1, with the ground wire 148 from the lowest positioned hanger rail 120 directly connected to common earth ground 153. A preferable means of interconnecting long ground wires 148 utilizes a grounding clamp arrangement as subsequently described herein.

As apparent from the foregoing, the short ground wire 138 connected to either of the rivets 126 may be used to ground the rail 120. Two ground wires 148 are provided only for convenience and the use of one will sufficiently ground the rail 120. The rivets 126 and machine screws 146 are constructed of highly conductive and corrosion-resistant materials which do not require surface painting. In view of the small physical size of these connecting components, they can be so constructed without being prohibitively expensive. These connecting components provide a low impedance path between plates 124 and wires 138. The combination of the plates 124, connecting components as previously described, wires 138 and ground wires 148 provides a low impedance discharge path between the conductive totes 132 and common earth ground 153 although the support panels 102 and 104 may be painted with materials which tend to be electrically isolating.

Other types of containers used in the work station 100 are illustrated in FIG. 1 as dispensing containers 160. The containers 160, like totes 132, are constructed of conductive materials and can be used to store sensitive electrical components. However, the components typically stored in dispensing containers 160 are those which are individually and manually removed for direct use in operations at the work station 100. Accordingly, the conductive containers 160 are tilted and located at work station positions so as to provide ease of access by user personnel.

Figure 7:
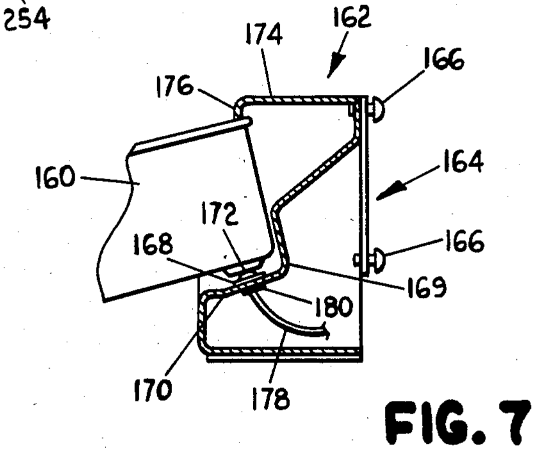
FIG. 7 depicts the connection of a container to the dispensing rail with the grounding arrangement connected thereto in accordance with the invention.
Figure 6:
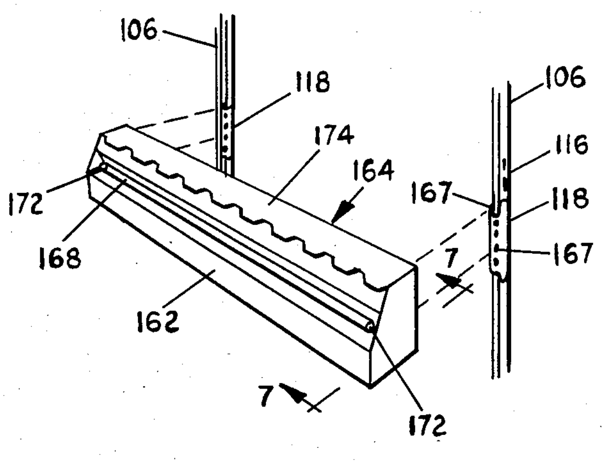
FIG. 6 depicts the connection of a dispensing rail to the work station depicted in FIG. 1.

The dispensing containers 160 are suspended from the panel members 102 and 104 by means of dispensing rails 162. As depicted in FIGS. 6 and 7, each dispensing rail 162 includes a back portion 164 having a pair of studs 166 extending rearwardly therefrom at each end of rail 162. The studs 166 engage corresponding slots 167 on the hanger clips 118 previously described with respect to rails 120. The clips 118 can be selectively engaged in the panel member slots 116 at a height selected by the work station user.

Each dispensing rail 162 includes an elongated metallic grounding plate 168 extending along the upper surface of a slanted portion 170 of rail 162. The plate 168 is rigidly attached to the portion 170 by means of adhesive on the back side of the strip 168. Copper rivets 172 extend through the plate 168 and the portion 170. At the upper area of each dispensing rail 162, a horizontal portion 174 extends forwardly and terminates in a downwardly extending flange 176. When a container 160 is suspended from the rail 162, the flange 176 contacts the inner surface of the container 160 and the outer bottom surface of container 160 contacts the metallic grounding plate 168. As depicted in FIG. 7, the container 160 can include a lower ridge 169 extending the length of the bottom surface to insure continuous weighted contact with plate 168.

In a manner similar to that described with respect to the hanger rails 120, a short ground wire 178 having a conductive connector ring 180 is secured to each of the rivets 172. The work station user can select either of the short wires 178 and conductively connect the same to an earth ground through a long grounding wire (not shown) in a manner similar to that described with respect to hanger rails 120. Accordingly, a low impedance discharge path is provided between the containers 160 and common earth ground 153.

As depicted in FIG. 1, the work station 100 also includes variously sized work surfaces 182. The work surfaces 182 can be suspended from the panel members 102 and 104 by means such as the hanger clips 118 or other suitable connecting means. The work surfaces 182 are also provided with means to ground the surfaces to an earth ground. To provide suitable conductivity of the surfaces 182, they can be provided with a high pressure laminate having a carbon layer. Such laminates are well-known and, for example, a suitable laminate commercially known as MICASTAT can be obtained from Charles Water Products, Inc. For purposes of grounding the conductive work surfaces 182 to an earth ground, the laminate surfaces can be interconnected with ground wires 184 through suitable connecting means such as grounding bolts 186 and wing nut/lock washer attachments 188 shown in FIG. 12.

It is preferable to secure all components of work station 100 to a common earth ground. That is, if fairly high voltage power lines, inductive machinery or computers are near the work station environment, potentials can readily be induced between different earth grounds. Accordingly, common ground locations are desirable.

To achieve the afore-described common grounding, an arrangement as depicted in FIG. 12 can be utilized. FIG. 12 shows the interconnection of a pair of panels 102, each having a work surface 182 mounted to the panel with the long ground wire 184 conductively connected thereto by means of the bolt 186 and wing nut/-lock washer attachment 188. The ground wires 184 pass through a shield 190 mounted to a side member 106 of one of the panels 102. The ground wires 184 extend through the lower end of the shield 190 and are mounted to one of the bottom members 110 of panel 102 by means of a ground clamp 192.

As depicted in FIG. 13, the ground clamp 192 includes a metallic horizontal portion 194 having a pair of downwardly extending flanges 196. A conductive set screw 197 having a conically shaped termination 202 threadably engages a bore in each of the flanges 196. The terminations 202 impinge on opposing sides of the panel bottom member 110 and pierce the surface paint of the member 110 to achieve a conductive contact therewith.

A third set screw 198 also having a conical termination 202 threadably engages a vertical bore in the center of horizontal portion 194 and impinges on the top surface of bottom member 110. A threaded stud 204 is mounted to the set screw 198 and the ground wires 184 are connected thereto by means of connector rings 206 and nut 208. One end of a connecting wire 210 is mounted to the threaded stud 204 of ground clamp 192 in conductive relationship with ground wires 184. The connecting wire 210 is connected at its other end to a ground clamp 212 mounted on the member 110 of panel 102 interconnected with the panel 102 to which ground clamp 192 is connected. Conductively connected to ground clamp 212 and connecting wire 210 is a common wire 214 which can be connected to a common earth ground 153. It is apparent the long grounding wires 184 connected the work surfaces 182 can also be connected to hanger rails 120 and dispensing rails 162 as previously described herein.

With the ground clamps 192 and 212 impinging on the bottom members 110 through the painted surfaces thereof, the aforedescribed arrangement provides a means to conductively interconnect the various panel members 102 and 104. In addition, the long grounding wires 184 electrically interconnect the various work surfaces 192, totes 132 and dispensing containers 160 mounted on panels 102 and 104 throughout work station 100 to a common earth ground. It should be emphasized that various U.S. Governmental regulations require suitable resistance between the common earth ground 153 and the aforedescribed grounding clamps 192 and 212. For example, a one Megaohm resistor may be inserted between earth ground 153 and clamps 192, 212.

The anti-static grounding arrangement heretofore described in accordance with the invention is adapted for use with components of a stationary work station 100. However, storage components such as the conductive totes 132 must often be moved between work stations or to other locations. Such totes 132 can build up electrostatic charge during transport, unless suitable means for avoiding such build-up are utilized.

Figure 8:
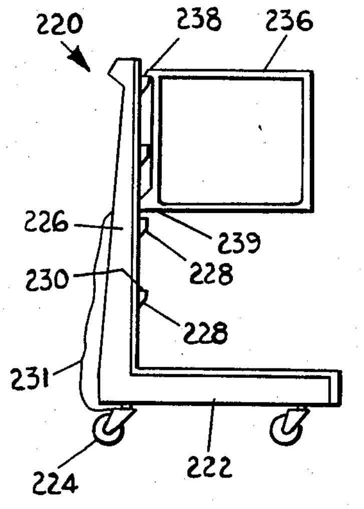
FIG. 8 depicts a side view of transport cart having a grounding arrangement in accordance with the invention.
Figure 9:
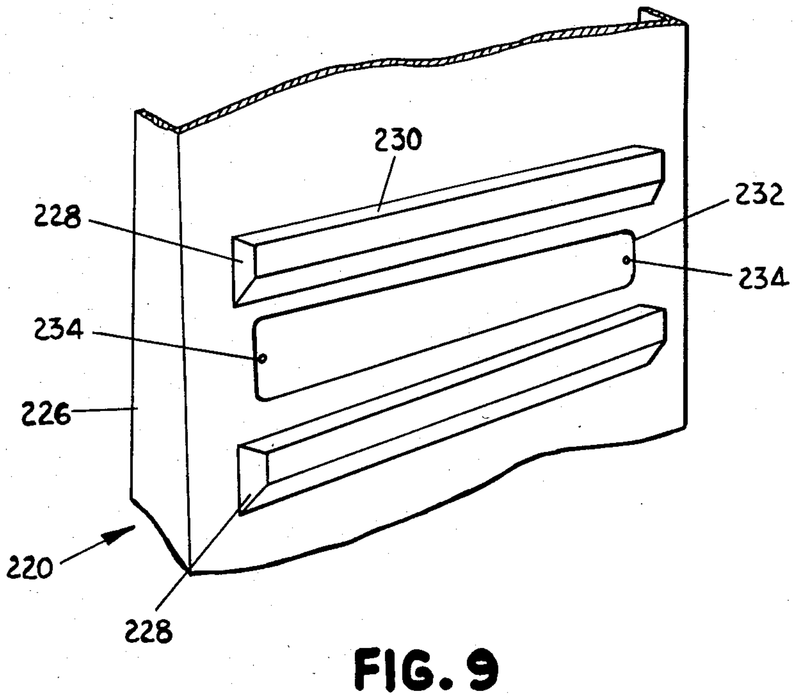
FIG. 9 is a sectional view of the transport cart depicted in FIG. 8 showing the connection of a conductive plate to the cart.

To achieve grounding during transport in accordance with the invention, a transport cart 220 as depicted in FIGS. 8 and 9 can be utilized. The transport cart 220 includes a base portion 222 having at least one conductive caster 224 or similar conductive rolling means connected to the lower surface of base portion 222. A vertical support section 226 is integral with or otherwise secured to the base portion 222 and includes a set of integral rails 228 horizontally disposed on the front surface of vertical portion 226.

The integral rails 228 protrude outwardly from the portion 226 and each includes an opened recess 230 at the upper portion thereof. As depicted in FIG. 9, a conductive interface comprising metallic grounding plates 232 constructed of stainless steel or other corrosion resistant conductive material are attached to the vertical portion 226 by means of rivets 234 between the rails 228. As partially depicted in FIG. 8, ground wires or other suitable conducting means are conductively connected to the terminating ends of rivets 234 at the rear surface of vertical portion 226. The conductive connections of these wires 231 can be achieved in a manner similar to that previously described with respect to ground wire connections for hanger rails 120 and dispensing rails 162. The ground wires 231 are also conductively connected in any suitable manner to at least one of the conductive casters 224.

With the metallic grounding plates 232 connected to the transport cart 220 as heretofore described, container transport means such as conductive container 236 depicted in FIG. 8 can be utilized. Container 236 includes a lip portion 238 at its rear upper portion which is positioned within a recess 230 of one of the rails 228 when the container 236 is suspended on cart 220. The lower portion of container 236 includes a flange portion 239 extending rearwardly therefrom and which is supported against and contacts one of the metallic grounding plates 232 when the container 236 is mounted on cart 220. In this manner, a conductive connection is made from the conductive container 236 through the metallic plate 232 and a low impedance discharge path is provided to earth through the conductive casters 234. Accordingly, the containers 236 do not tend to build up electrostatic charge during transport.

Another embodiment of a means for providing anti-static protection during transport is depicted in FIGS. 10 and 11. In FIG. 10, a transport cart 240 includes a base portion 242, at least one conductive caster 244 attached thereto, and a vertical support portion 246. The support portion includes a recessed area 248 having a set of horizontally disposed support rails 250 extending forward therefrom. A conductive metallic grounding plate 252 is connected by rivets 254 to the front surface of each support rail 250. The rivets are connected to ground wires or other suitable conductive connecting means which, in turn, are connected to the conductive caster 244.

When a storage container, such as one of the conductive totes 132 previously described with respect to hanger rails 120, is to be transported, its upper lip 134 is suspended around an upper flange 251 of one of the support rails 250. The rear outer surface of the tote 132 abuts the metallic grounding plate 252 connected to the support rail 250 to which the tote 132 is suspended and at least one of the plates 252 connected to a lower support rail 250 as depicted in FIG. 10. In accordance with the foregoing, the totes 132 can be prevented from accumulating electrostatic charge during transport. The conductive casters 244 can be constructed of steel with carbon impregnated nylon or rubber materials. Alternatively, a metallic drag chain or similar means can be utilized to provide a low impedance electrical connection between the cart 240 and ground.

In summary, a work environment system includes work stations 100 having frames with panel members 102, 104 which can mount functional work station components such as conductive work surfaces 182 and conductive containers 132, 160. The system also includes transport carts 220, 240 employed to transport various items between the work stations 100 and other locations. To overcome the problem of electrostatic charge accumulation, which may be harmful to sensitive items such as electronic components, conductive interfaces are provided between the functional system components, and between the components and the system structures. Means are provided to ground the interfaces to an earth ground. Accordingly, potentially harmful electrostatic charge accumulation is prevented.

It should be noted that the various details of the antistatic grounding arrangement described herein is an exemplary embodiment in accordance with the invention and is not meant to be an exhaustive enumeration. For example, various types of interconnections can be utilized for ground wires electrically connected to the hanger rails 120, dispensing rails 162 and work surfaces 192 previously described herein. In addition, the containers such as totes 132 and dispensing containers 160 can be of various sizes and structural configurations. Accordingly, it will be apparent to those skilled in the art of work station design and electrical grounding configurations that other modifications and variations of the above-described illustrative embodiments of the invention can be effected without departing from the spirit and scope of the novel concepts of the invention.

The embodiments of the invention in which an exclusive property or privlege is claimed are defined as follows:

1. In a work environment system for product assembly, storage, packaging and/or shipping operations, wherein the system comprises a plurality of support frames defining one or more work stations and/or storage areas and having relatively nonconductive surfaces, at least one or more work surfaces mounted to at least one support frame, a plurality of containers having conductive properties and means for removably mounting the containers to the support frames, wherein certain of the containers are removably mounted to the support frames, the improvement which comprises:

conductive interface means mounted intermediate the containers and the support frames, and providing a conductive interface therebetween;

interface grounding means interconnected to the conductive interface means and an earth ground providing a low impedance discharge path to earth ground from the containers, work surfaces and frames;

transport carts for transporting the removable containers between work stations;

means for removably suspending the removable containers on the carts;

transport interface means providing a conductive interface between the removable containers and the transport carts, and comprising metallic grounding plates conductively connected to the transport carts so that each of the containers suspended on the transport carts abuts at least one of the metallic grounding plates; and transport grounding means connected to the transport interface means and comprising at least open conductive caster in contact with ground level and mounted to each of the transport carts, and means to electrically interconnect each of the metallic grounding plates on one of the transport carts to the conductive caster on the one transport cart, wherein the grounding means continuously provides a low impedance discharge path from the transport carts and containers suspended thereon to an earth ground.

2. A work environment system in accordance with claim 1 characterized in that the conductive interface means comprises metallic grounding plates, conductively connected to the support frames, and each of the containers mounted to the support frames abut at least one of the metallic grounding plates.

3. A work environment system in accordance with claim 2 characterized in that the interface grounding means comprises at least one ground clamping means connected to each of the metallic grounding plates, work surfaces and each of the frame supports associated with one work station interconnecting the support frames, containers and work surfaces of the one work station to a common earth ground.

4. A work environment system in accordance with claim 3 characterized in that the ground clamping means comprises impinging means piercing painted surfaces of the support frames to provide a low impedance discharge path between the support frames and the common

5. A work environment system in accordance with claim 1 characterized in that the system further comprises rail support means selectively mounted to the support frames for supporting and positioning each of the containers at selective heights relative to ground level, wherein the containers can be selectively positioned at any of a continuum of locations along the rail support means, and the conductive interface means comprises metallic grounding plates conductively connected to the rail support means, wherein each of the metallic mounting plates abut one of the storage containers when the containers are suspended from the rail support means at any of the continuum of locations.

6. A work environment system in accordance with claim 5 characterized in that the interface grounding means comprises wire means interconnecting the metallic grounding plates and earth ground.

7. A work environment system in accordance with claim 1 characterized in that the containers are constructed of plastic materials having conductive carbon materials embedded therein.

8. A work environment system in accordance with claim 1 characterized in that the containers comprise interengaging means engaging the containers with the mounting means so as to support the containers on the support frames ina cantilevered manner.

9. A work environment system in accordance with claim 1 characterized in that the conductive interface means comprises:

a conductive laminate mounted on each of the work surfaces, and the interface grounding means comprises means electrically interconnecting the conductive laminate to the earth ground.

* * * * *